United States Patent
Jeong et al.

(10) Patent No.: US 8,593,600 B2
(45) Date of Patent: Nov. 26, 2013

(54) LIQUID CRYSTAL PANEL FABRICATION METHOD

(75) Inventors: Woo-Nam Jeong, Gyeonggi-Do (KR); Su-Hyun Park, Gyeonggi-Do (KR)

(73) Assignee: LG Display Co., Ltd., Seoul (KR)

(*) Notice: Subject to any disclaimer, the term of this patent is extended or adjusted under 35 U.S.C. 154(b) by 1543 days.

(21) Appl. No.: 11/646,488

(22) Filed: Dec. 28, 2006

(65) Prior Publication Data
US 2008/0043175 A1    Feb. 21, 2008

(30) Foreign Application Priority Data

Jun. 30, 2006 (KR) .................. 10-2006-0061257

(51) Int. Cl.
   *G02F 1/1337* (2006.01)
   *G02F 1/13* (2006.01)
(52) U.S. Cl.
   USPC ........................................ 349/123; 349/187
(58) Field of Classification Search
   USPC ......... 349/153–154, 190, 123, 124, 149, 151, 349/152, 187
   See application file for complete search history.

(56) References Cited

U.S. PATENT DOCUMENTS

| | | | | |
|---|---|---|---|---|
| 5,851,423 A * | 12/1998 | Teng et al. | ................. | 252/299.1 |
| 2002/0176042 A1 * | 11/2002 | Moon et al. | ................. | 349/123 |
| 2003/0081155 A1 * | 5/2003 | Moon et al. | ................. | 349/106 |
| 2005/0122463 A1 * | 6/2005 | Byun et al. | ................. | 349/187 |
| 2005/0185129 A1 * | 8/2005 | Kim et al. | ................. | 349/156 |
| 2005/0245422 A1 * | 11/2005 | Yamada et al. | ................. | 510/417 |
| 2006/0197899 A1 * | 9/2006 | Kamiya et al. | ................. | 349/124 |

FOREIGN PATENT DOCUMENTS

JP    10104625 A *    4/1998    ............ G02F 1/1337

* cited by examiner

*Primary Examiner* — Jessica M Merlin
(74) *Attorney, Agent, or Firm* — Morgan, Lewis & Bockius LLP

(57) ABSTRACT

A method for fabricating a liquid crystal panel includes providing first and second mother substrates having a plurality of panel regions, forming a plurality of array substrates in the plurality of panel regions of the first mother substrate, forming a plurality of color filter substrates in the panel regions of the second mother substrate, forming a first alignment film over the first mother substrate, rubbing the first alignment film covering the first mother substrate, attaching the first and second mother substrates, and cutting the attached mother substrates into a plurality of liquid crystal panels.

3 Claims, 9 Drawing Sheets

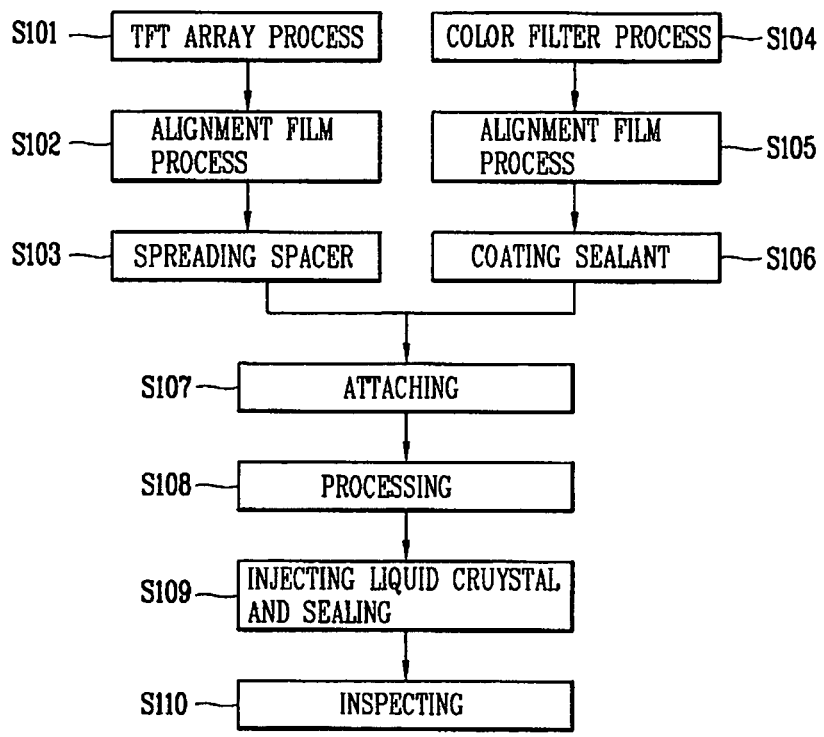
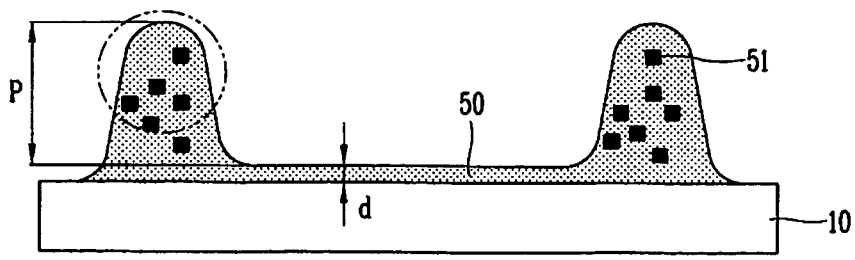

LIQUID CRYSTAL PANEL FABRICATION METHOD

This invention claims the benefit of Korean Patent Application No. 2006-0061257 filed in Korea on Jun. 30, 2006, which is hereby incorporated by reference in its entirety.

BACKGROUND OF THE INVENTION

1. Field of the Invention

Embodiments of the invention relate to a display device and, more particularly, to a liquid crystal panel and a fabrication method thereof. Although embodiments of the invention are suitable for a wide scope of applications, they are particularly suitable for preventing a defective rubbing and improving productivity of an alignment film process.

2. Description of the Related Art

As consumer interest in information displays grows, the demand for portable information display devices is increasing. Accordingly, research and commercialization of lightweight and thin flat panel displays ("FPD") have increased. Flat panel displays are replacing the cathode ray tube ("CRT"), which was the most common display device.

The liquid crystal display ("LCD") device is an FPD device for displaying images that uses the optical anisotropy of liquid crystal molecules. More specifically, the LCD is a display device in which data signals according to image information are individually supplied to liquid crystal cells arranged in a matrix shape to control light transmittance of the liquid crystal cells so as to display desired images. LCD devices exhibit excellent resolution, color rendering and picture quality. Thus, LCD devices are widely being used in notebook computers or desktop monitors, and the like.

FIG. 1 is an exploded perspective view showing the structure of a liquid crystal panel in an LCD device according to the related art. As shown in FIG. 1, the liquid crystal panel includes a color filter substrate 5, an array substrate 10, and a layer of liquid crystal molecules 40 positioned between the color filter substrate 5 and the array substrate 10. The color filter substrate 5 includes a color filter layer C having red (R), green (G) and blue (B) sub-color filters 7, a black matrix 6 for separating the sub-color filters 7 and blocking light transmission, and a transparent common electrode 8 for applying voltage to the layer of liquid crystal molecules 40. The array substrate 10 includes gate lines 16 and data lines 17 that are arranged on the substrate 10 and define pixel regions P. A thin film transistor (TFT), which is a switching element, is formed at respective crossings of the gate lines 16 and the data lines 17, and a pixel electrode 18 is formed in each pixel region P.

The pixel region P is a sub-pixel corresponding to one sub-color filter 7 of the color filter substrate 5, and a color image is obtained by combining light from the three types of red, green and blue sub-color filters 7. In other words, the three red, green and blue sub-pixels form one pixel, and the TFTs are respectively connected to the pixels in the red, green and blue sub-pixels. Alignment films (not shown) for aligning the liquid crystal molecules 40 are respectively formed on the color filter substrate 4 and the array substrate 10.

The process for fabricating a liquid crystal panel can be divided into an array process for forming a driving element on the lower array substrate 10, a color filter process for forming color filters on the upper color filter substrate 4, and a cell process. FIG. 2 is a flow chart illustrating the processes of a method for fabricating the liquid crystal panel in an LCD device according to the related art. The method for fabricating the liquid crystal panel will now be described in detail with reference to FIG. 2.

A plurality of gate lines and a plurality of data lines are formed to define pixel regions on the lower substrate in the array process, and TFTs, driving elements, are formed in the pixel regions and connected with the gate lines and data lines (step S101). Then, pixel electrodes are formed so as to be connected to the TFTs through the array process. The pixels electrodes are used to drive the layer of liquid crystal molecules when a signal is applied through the TFTs.

In a separate process from the array process, R, G and B color filters for implementing colors, and common electrodes are formed on the upper substrate 3 according to the color filter process (step S104).

Subsequently, alignment films are coated on the upper and lower substrates and rubbed to provide an alignment anchoring force or a surface fixing force (namely, a pretilt angle and an alignment direction) to the liquid crystal molecules positioned between the upper and lower substrates (steps S102 and S105). Thereafter, spacers for uniformly maintaining a cell gap are spread on the lower substrate (step S103). Subsequently, a sealant is coated on an outer edge portion of the upper substrate (step S106), and then the lower and upper substrates are attached by applying pressure thereto (step S107).

The lower and upper substrates are formed as large-scale glass substrates. In other words, a plurality of panel regions are formed on a large-scale mother substrate, and the TFTs, the driving elements, and the color filter layers are formed on individual panel regions. To separate the individual panels, the mother substrate is processed (step S108) so as to cut the mother substrate into the individual panels. Thereafter, liquid crystal is injected into each of the processed liquid crystal panels through a liquid crystal injection hole, and the liquid crystal injection hole is encapsulated to form the liquid crystal layer (step S109). Then, each liquid crystal panel is inspected to complete fabrication of liquid crystal panels (step S110).

In the alignment film printing and alignment process, the alignment film is patterned and printed on the large-scale mother substrates by using a resin plate having a pattern according to each model of the individual panel region, and then a rubbing process is performed. In the general process of forming the alignment film, the alignment film is patterned and printed corresponding to the plurality of panel regions on the large-scale mother substrate by using the resin plate, but when the size of the mother substrates changes or increases, the resin plate has to be replaced by an appropriately redesigned resin plate. Redesign and fabrication of the replacement resin plate take a long time, so that changing the patterning printing process of the alignment film is difficult and unproductive.

FIG. 3 is an exemplary view showing a phenomenon in that an alignment layer builds-up at an edge portion of an alignment layer pattern. Because the alignment film is pattern-printed, a defect may result from the alignment film printing. More specifically, when the alignment film is pattern-printed, as shown in FIG. 3, the solution builds-up at end portions (namely, the edge portion indicated by a circular dotted line) of the printed pattern 50. The build-up, considerably increases the thickness of the printed pattern 50 at the edge portion compared with the image display region in a central portion of the printed pattern 50. Further, alignment remainders 51 or impurities gather in the build-ups at the end portions of the printed pattern 50. The difference between a thickness (d) of the central portion of the printed pattern 50 and a thickness (P) of the build-ups at the edge portions is sufficient from a step that causes a rubbing scratch and/or a vertical line deficiency during a subsequent rubbing process.

SUMMARY OF THE INVENTION

Accordingly, embodiments of the invention are directed to a liquid crystal panel and its fabrication method that substantially obviate one or more of the problems due to limitations and disadvantages of the related art.

An object of embodiments of the invention is to provide a liquid crystal panel capable of preventing a rubbing deficiency and improving productivity of an alignment film printing process, and its fabrication method Another object of the invention is to provide a liquid crystal panel capable of smoothly performing an auto-probing on and attaching a PCB of a pad part, and its fabrication method.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of the embodiments of the invention, as embodied and broadly described herein, a method for fabricating a liquid crystal panel includes providing first and second mother substrates having a plurality of panel regions, forming a plurality of array substrates in the plurality of panel regions of the first mother substrate, forming a plurality of color filter substrates in the panel regions of the second mother substrate, forming a first alignment film over the first mother substrate, rubbing the first alignment film covering the first mother substrate, attaching the first and second mother substrates, and cutting the attached mother substrates into a plurality of liquid crystal panels In another aspect, a liquid crystal panel includes a first substrate on which thin film transistors are formed, a second substrate attached to the first substrate and having color filters formed thereon, a first alignment film formed over the first surface of the first substrate, excluding a pad part of the first substrate such that the pad part of the first substrate is exposed, a second alignment film formed on the second surface of the second substrate, a seal pattern formed on the second alignment film and the first alignment film, and a layer of liquid crystal layer molecules between the first and second substrates.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings:

FIG. 2 is a flow chart illustrating the processes of a method for fabricating the liquid crystal panel in an LCD device according to the related art;

FIG. 3 is an exemplary view showing a phenomenon in that an alignment layer builds-up at an edge portion of an alignment layer pattern;

DETAILED DESCRIPTION OF THE PREFERRED EMBODIMENTS

Figure 1:
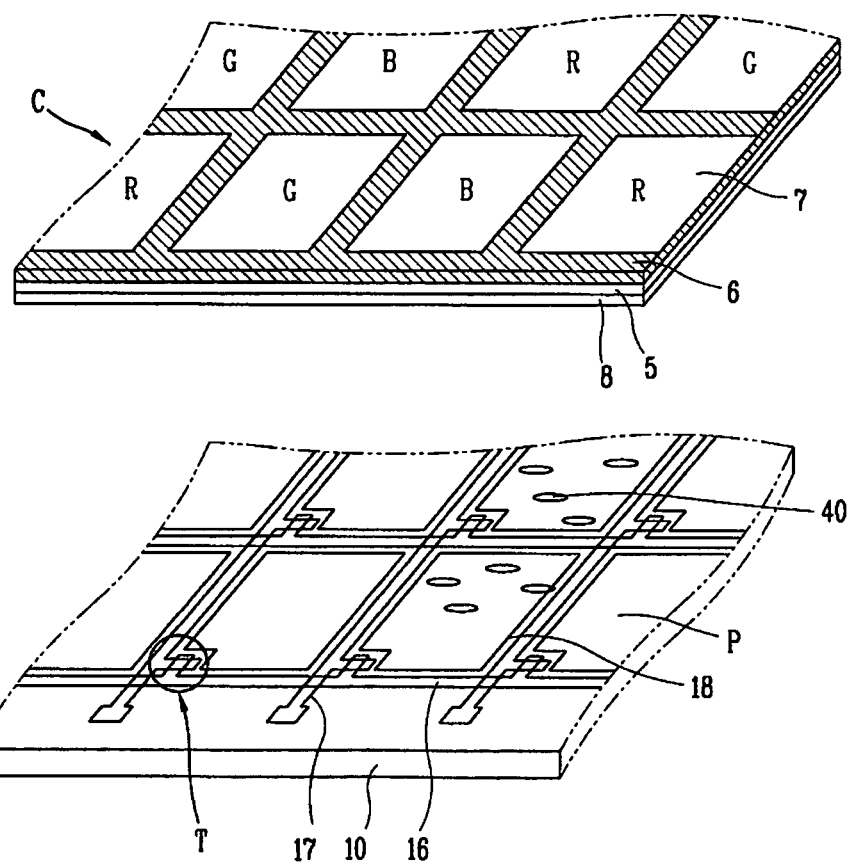
FIG. 1 is an exploded perspective view showing the structure of a liquid crystal panel in an LCD device according to the related art.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 4:
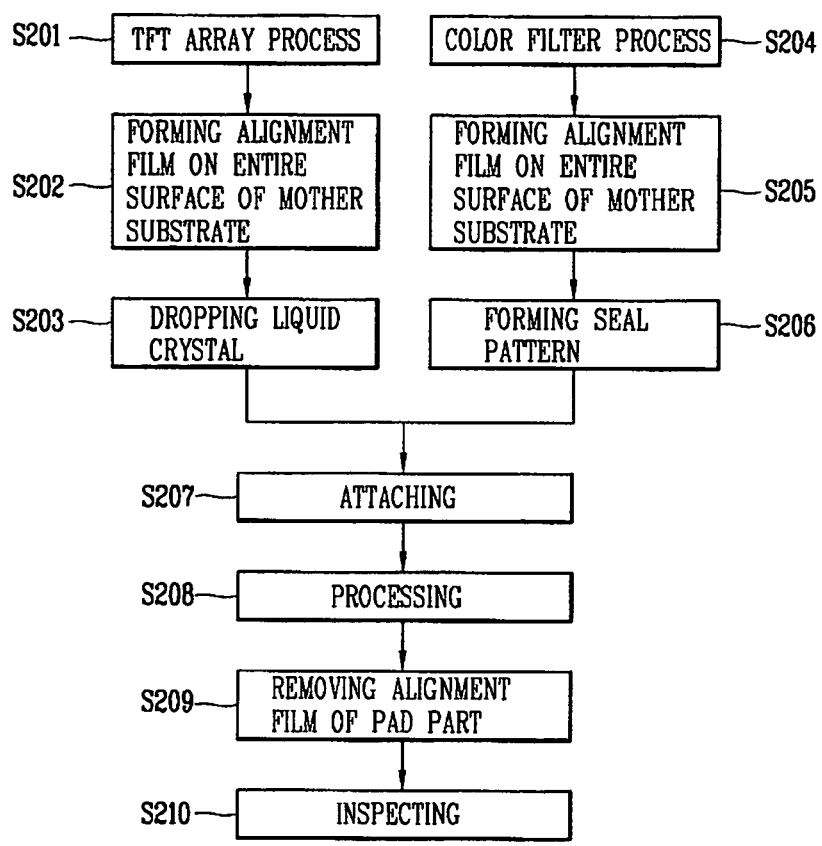
FIG. 4 is a flow chart illustrating the sequential processes of a method for fabricating a liquid crystal panel according to an exemplary embodiment of the invention.

FIG. 4 is a flow chart illustrating the sequential processes of a method for fabricating a liquid crystal panel according to an exemplary embodiment of the invention. More specifically, FIG. 4 shows an example of a method for fabricating a liquid crystal panel when a layer of liquid crystal molecules is formed with a liquid crystal dropping method according to an embodiment of the invention. FIGS. 5A to 5F are schematic views for supplementing explanation of the flow chart for fabricating the liquid crystal panel in FIG. 4. A process for fabricating the liquid crystal panel can be divided into a TFT array process for forming a switching element on the lower array substrate, a color filter process for forming color filters on an upper color filter substrate, and a cell process.

A plurality of gate lines and a plurality of data lines are arranged to define pixel regions on the lower substrate, and TFTs, switching elements, are formed to be connected with the gate lines and the data lines at each of the pixel regions through the array process (step S201 in FIG. 4). In addition, pixel electrodes are formed so as to be connected to the TFTs through the array process. The pixel electrodes are used to drive the liquid crystal layer upon receiving signals applied through the TFTs.

In a separate process from the array process, color filter layers, including red, green and blue sub-color filters and common electrodes are formed on the upper substrate through the color filter process (step S204 in FIG. 4).

The upper and lower substrates are formed as large-scale mother substrates. In other words, a plurality of individual panel regions are formed on the large-scale mother substrates and the TFTs, the switching elements, and the color filter layers are formed in each panel region.

Figure 5A:
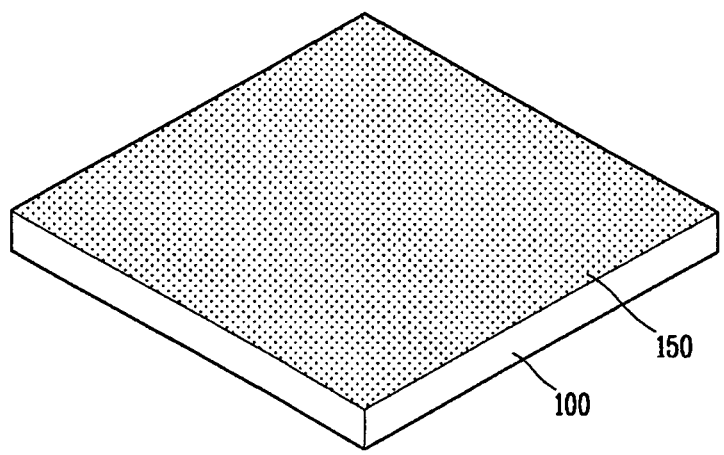
FIGS. 5A to 5F are views for supplementing explanation of the flow chart for fabricating the liquid crystal panel in FIG. 4.
Figure 5B:
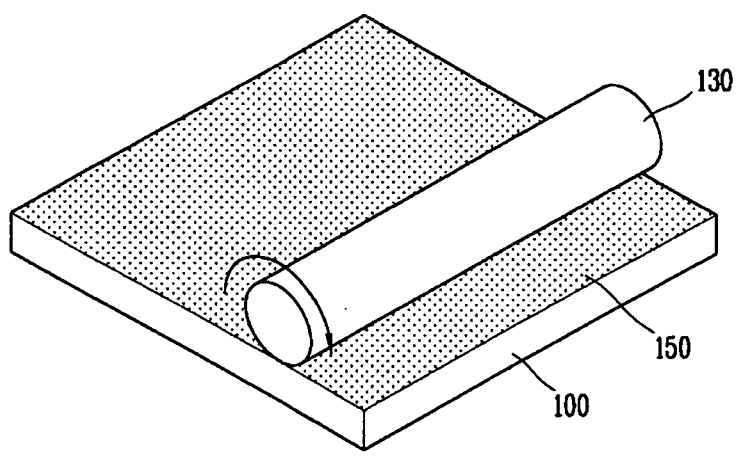

Subsequently, as shown in FIG. 5A, an alignment film 150 is formed over the entire surface of the first mother substrate 110 constituting the upper or lower substrate, and processed to provide an anchoring force or a surface fixing force (namely, a pretilt angle and an alignment direction) to the liquid crystal molecules that will subsequently be dropped on the lower substrate (steps S202 and S205 in FIG. 4). The process can be a photo alignment method or a rubbing method using a roller 130, as shown in FIG. 5A. After the processing is finished, the first mother substrate 100 is inspected as to whether the alignment film is defective or not by using an alignment film inspecting unit.

The liquid crystal panel uses the electrooptical effect of liquid crystal molecules. The electrooptical effect of liquid crystal molecules is determined by anisotropy of the liquid crystal material itself and a state of an arrangement of the liquid crystal molecules, so controlling of the arrangement of the liquid crystal molecules influences the stability of the display quality of the liquid crystal panel. To effectively align the liquid crystal molecules, the process of forming the alignment film is very important to the picture quality of the liquid crystal panel.

Instead of the alignment film pattern printing method, embodiments of the invention use an overall surface printing method for forming the alignment film 150 on the entire surface of the mother substrate 100 to eliminate the necessity of redesigning or replacing the above-mentioned resin plate. Further, the overall surface printing method decreases buildups at the end portions of the printed pattern so as to prevent defective rubbings. The method of printing the alignment film on the overall surface of the mother substrate 100 is advantageous in that the resin plate for providing the alignment film can be commonly used any model of liquid crystal panels being manufactured on the mother substrate 100. Thus, productivity of the operation can be considerably enhanced since resin plate switchovers are not necessary, and the costs of fabricating different types of resin plates for different models of liquid crystal panels can be saved.

When the layer of liquid crystal molecules is provided by using a vacuum injection method, spacers for uniformly maintaining a cell gap are formed on the lower substrate and a sealant is coated on an outer edge of the upper substrate. And then, the lower and upper substrates are attached by applying pressure thereto. In this case, the spacers can be ball spacers according to a spreading method, or can be columnar spacers formed through patterning.

As mentioned above, the plurality of panel regions are formed on mother substrates, and the TFTs, the switching elements, and the color filter layer are formed in individual liquid crystal panel regions. Thus, to obtain a separate individual unit liquid crystal display panel, the glass substrates are processed to be cut apart. Thereafter, liquid crystal material is injected into each individual liquid crystal panel through a liquid crystal injection hole and the liquid crystal injection hole is sealed to form the layer of liquid crystal molecules therebetween. Then, each liquid crystal panel is inspected.

A vacuum injection method using a pressure difference can be employed to inject the liquid crystal material. That is, according to the vacuum injection method, a liquid crystal injection opening of the unit liquid crystal display panel separated from the large-scale mother substrates is put in a container filled with liquid crystal material within a chamber having a certain degree of vacuum, and then, the degree of vacuum is changed to allow liquid crystal to be drawn into the liquid crystal panel due to a pressure difference between the interior and the exterior of the liquid crystal panel. When the liquid crystal material has filled the inside the liquid crystal panel, the liquid crystal injection opening is sealed to form the layer of liquid crystal molecules within the liquid crystal panel. Thus, a portion of a seal pattern needs to be opened to serve as the liquid crystal injection opening to provide the layer of liquid crystal molecules in the liquid crystal panel through the vacuum injection method.

Figure 5C:
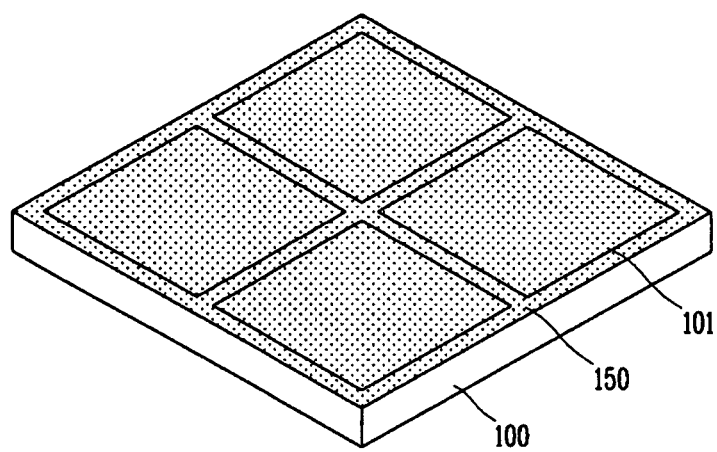
Figure 5D:
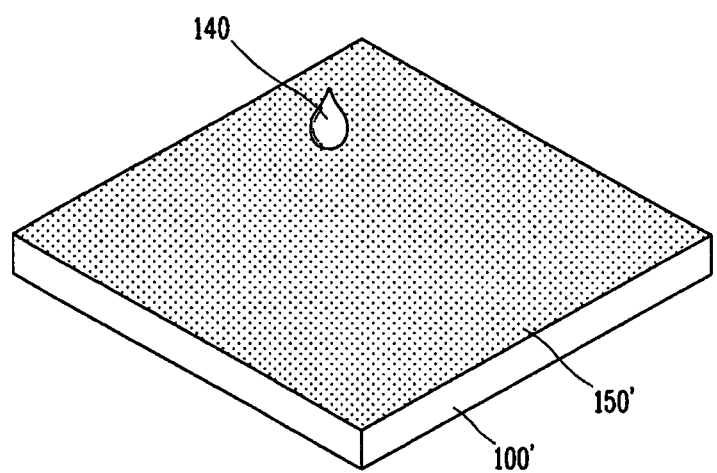

When the liquid crystal layer is provided according to a dropping method (step S203 in FIG. 4), as shown in FIG. 5C, a seal pattern 101 is formed with a sealant on the first mother substrate 100, which is the color filter substrate, after inspection of the alignment film is complete. In a separate step (step S206 in FIG. 4), as shown in FIG. 5D, liquid crystal material 140 is dropped onto a second mother substrate 100', which is the array substrate.

Figure 5E:
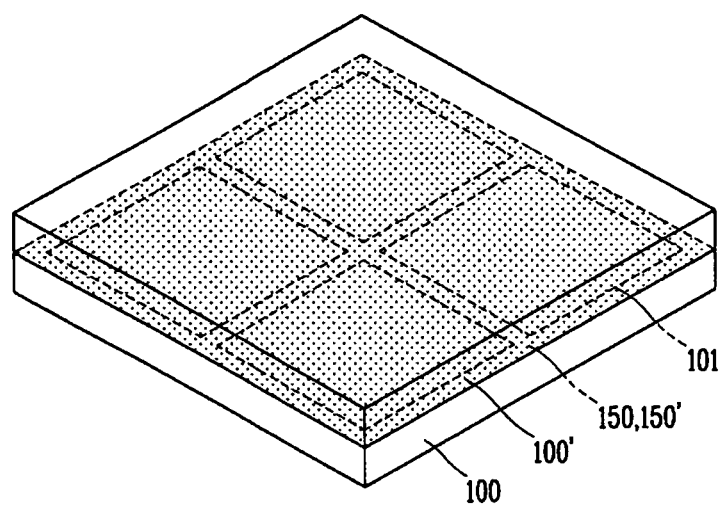

According to the dropping method, the liquid crystal material can be dropped onto an image display region of the large-scale first mother substrate 100 where the plurality of color filter substrates are disposed, or onto the second mother substrate 100' where the plurality of array substrates are disposed, by using a dispenser. Then, as shown in FIG. 5E, liquid crystal material is uniformly distributed through the entire image display region by pressure applied when the first and second mother substrates 100 and 100' are attached, to thus forming the layer of liquid crystal molecules (step S207 in FIG. 4). Thus, when the layer of liquid crystal molecules is formed on the liquid crystal display panel through the dropping method, the seal pattern 101 should be formed around the image display region in a pattern with a closed outer edge to prevent the liquid crystal material from leaking outside of the image display region.

Compared to the vacuum injection method, a layer of liquid crystal can be dropped within a short period of time, although the liquid crystal panel has a large size. Further, the dropping method can be easily implemented in automated processes. In addition, because only the required amount of liquid crystal material is dropped, the increase in the unit cost of the liquid crystal panel because of discarding high-priced liquid crystal, such as in the vacuum injection method, can be prevented.

Figure 5F:
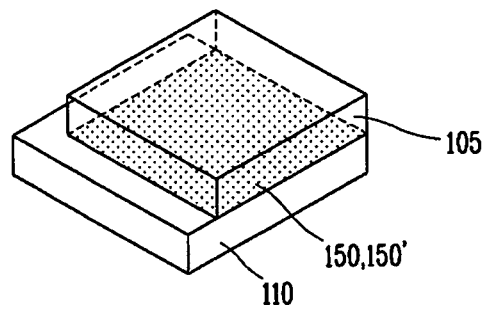

Through the dropping method, a plurality of liquid crystal panels are formed by attaching, pressing and cutting the first and second mother substrates 100 and 100' (step S208 in FIG. 4). Later, each liquid crystal panel is inspected (step S210 in FIG. 4). In embodiments of the invention, because the alignment films 150 and 150' are formed over all of the first and second mother substrates 100 and 100', as shown in FIG. 5E. Thus, a process of removing the alignment film 150' over the pad part of the array substrate 110 should be performed (step S209 in FIG. 4) before the inspecting process, as shown in FIG. 5F. Reference numeral 150 denotes an alignment film on a single color filter substrate 105, and reference numeral 150' denotes an alignment film on a single array substrate 100.

Because the alignment films 150 and 150' are formed over all of the first and second mother substrates 100 and 100' in embodiments of the invention, a process for removing the alignment film 150' on the pad parts of the array substrate 110 should be performed to allow an auto probing or a pad operation. The process of removing the alignment film on the pad part can be performed after a rubbing operation or a cell attaching process. To remove the alignment films on the pad part of the array substrate, a stripping solution or a dry etching method by plasma can be used.

Figure 6:
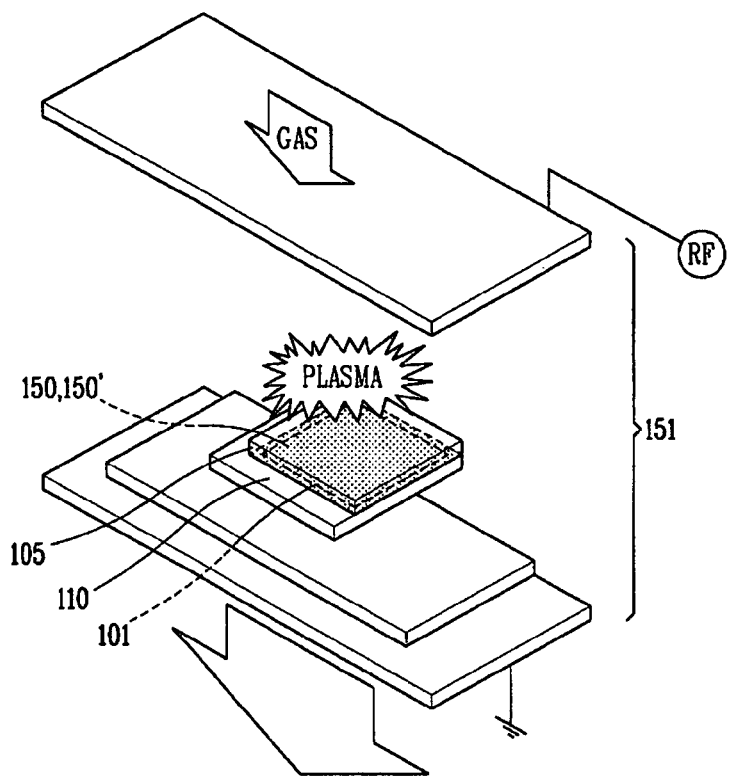
FIG. 6 is an exemplary view showing a method for removing the alignment layers on the pad part of an array substrate according to a first embodiment of the invention, in which a dry etching method using plasma is employed.

FIG. 6 is an exemplary view showing a method for removing the alignment layer on the pad part of an array substrate according to a first embodiment of the invention, in which the dry etching method using plasma is employed. As shown in FIG. 6, the dry etching method requires plasma equipment 151 and vacuum equipment such that the alignment film 150' on the pad part of the array substrate 110 can be selectively removed by plasma within the plasma equipment 151. In general, to remove the alignment film 150', $O_2$ plasma or $O_2+SF_6$ plasma is used. In this case, the conditions for the dry etching should be optimized to remove the alignment film 150' on the pad part to expose the pad part of the array substrate 110 without damaging the seal pattern 150 attaching the array substrate 110 and the color filter substrate 105. For example, the dry etching is performed under the conditions of a pressure of 500 mTorr, RF power of 2000 W, $O_2$ gas at 1500 sccm and $SF_6$ gas 40 sccm for 40 seconds.

Figure 7:
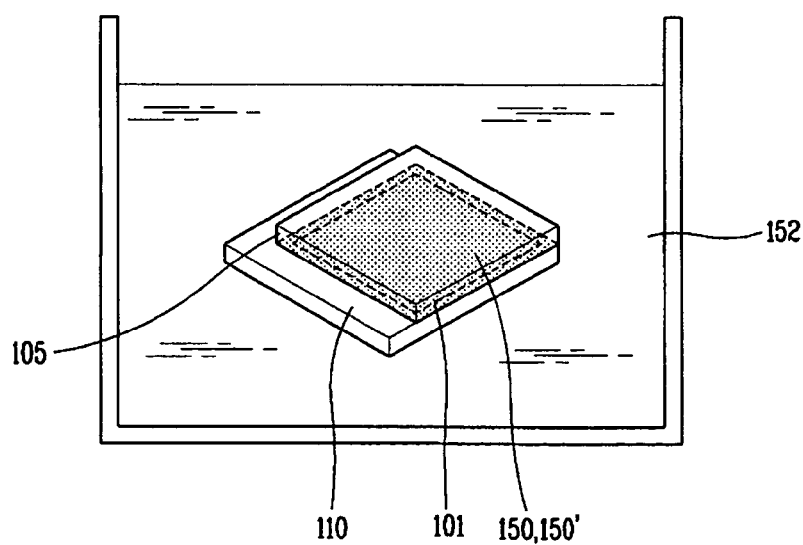
FIG. 7 is an exemplary view showing a method for removing an alignment layer of a pad part of an array substrate according to a second embodiment of the invention.

FIG. 7 is an exemplary view showing a method for removing an alignment layer of a pad part according to a second embodiment of the invention, in which the alignment film on the pad part of an array substrate is removed using an alignment film stripper. As shown in FIG. 7, the attached cell is put in a stripping solution 152 including the alignment film stripper to strip the alignment film 150 on the pad part so as to expose the pad part of the array substrate 110. The method for removing the alignment film on the pad part using the stripping solution 152 is advantageous in terms of processing time since a plurality of unit liquid crystal panels loaded in a cassette can be stripped at the same. In general, an alkali solution, including a surfactant, can be used as the alignment film stripper.

Figure 8:
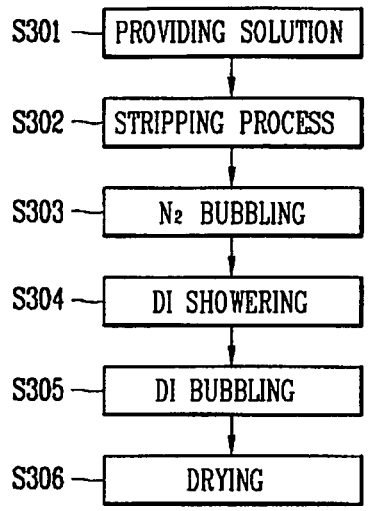
FIG. 8 is a flow chart illustrating the sequential processes of a method for removing the alignment layer on the pad part shown in FIG. 7 with an alignment film stripper.

FIG. 8 is a flow chart illustrating the sequential processes of a method for removing the alignment layer on the pad part shown in FIG. 7 with an alignment film stripper. As shown in FIG. 8, a solution including the alignment film stripper is provided, and the attached cell is put in the stripping solution for a predetermined amount of time to strip the alignment film (steps S301 and S302 in FIG. 8). In this case, determining of a composition of the stripping solution and a stripping time is important so as to only strip the alignment film on the pad part. For example, the stripping solution includes 20%~25% of a builder (tetramethyl ammonium hydroxide), 20%~25% of water-soluble solvent (dimethyl sulfoxide), 30%~45% of a metal ion sealing material (ethylenendiamine tetra-acetic acid), and 0.1% of surfactant, and 30%~40% of water. After the stripping, cleansing is performed in order to completely remove the stripping solution. That is, $N_2$ bubbling, DI showering and DI bubbling are performed to remove the stripping solution and then the cell is dried (steps S303 to S306 in FIG. 8).

Figure 9:
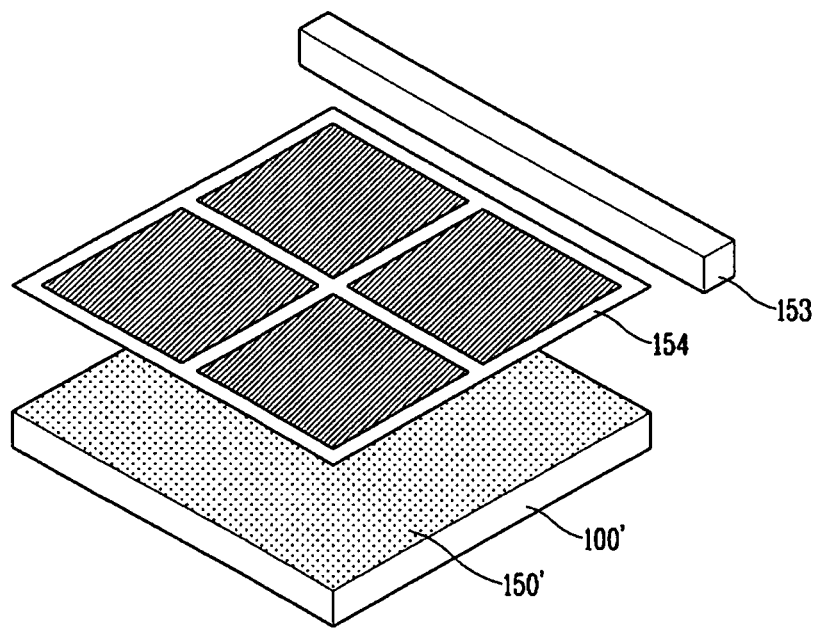
FIG. 9 is an exemplary view showing a method for removing an alignment layer on a pad part according to a third embodiment of the invention.

FIG. 9 is an exemplary view showing a method for removing an alignment layer on a pad part according to a third embodiment of the invention, specifically showing a process of ashing only the alignment layer on the pad part by using an ashing mask after rubbing. As shown in FIG. 9, according to a method for removing the alignment film according to the third embodiment of the invention, before the cell is attached, such as when the second mother substrate 100' is still a collection of array substrates, the alignment film 150' is removed at the pad parts so that a subsequent process for removing the alignment film when the array substrate and color substrate are attached is not necessary.

Although this method is disadvantageous in that an ashing mask 154 is required for each model and the ashing process is added, it is advantageous in that only the alignment film 150' of the pad part of the array substrate can be selectively removed.

Any light source can be used in the ashing equipment 153 so long as it has a wavelength of smaller than 250 nm. For example, excimer laser, a UV lamp or a halogen lamp can be used as well as room temperature plasma. Scanning type ashing equipment can be also used so as to shorten the process time of the ashing process. A cleansing operation for removing alignment film remnants after the ashing operation is repeated as the cleansing process after rubbing.

Figure 10A:
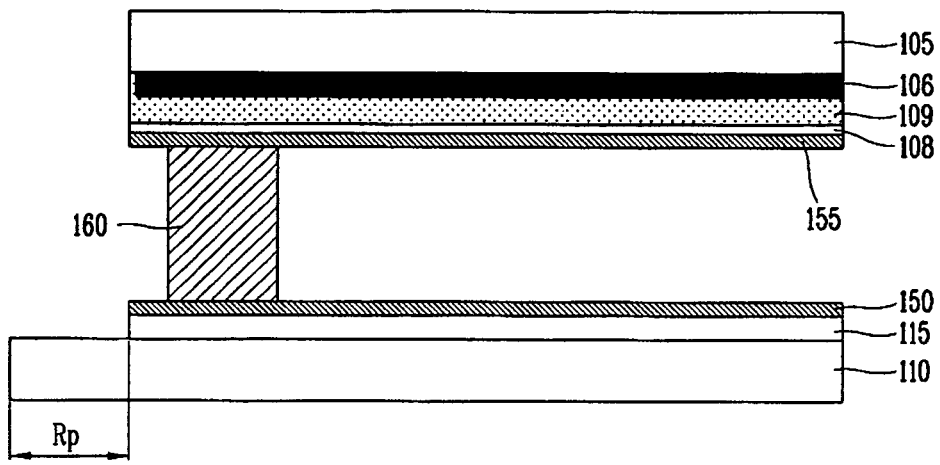
FIGS. 10A and 10B are cross-sectional views showing a liquid crystal panel fabricated according to an embodiment of the invention.
Figure 10B:
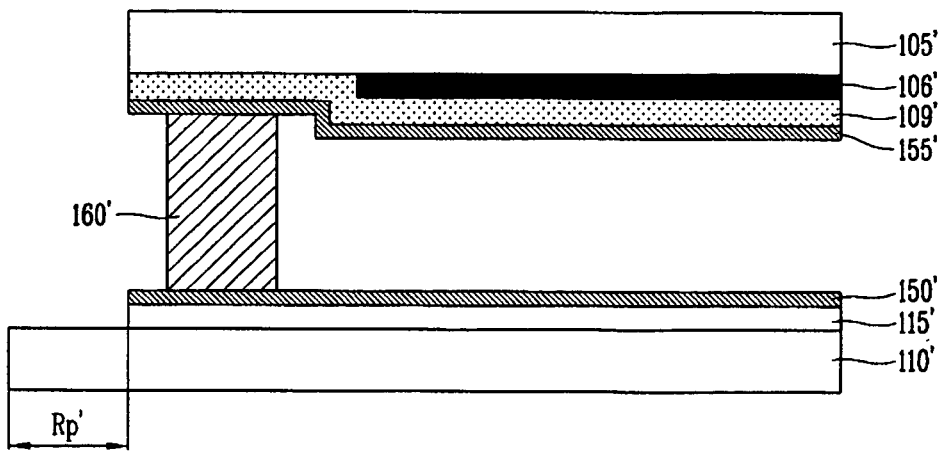

The structure of the liquid crystal panel from which the alignment film on the pad part has been removed according to the first to third embodiments of the invention will now be described in detail. FIGS. 10A and 10B are cross-sectional views showing a liquid crystal panel fabricated according to the embodiment of the invention. FIG. 10A shows a cross-section of a twisted nematic (TN) mode liquid crystal panel and FIG. 10B shows a cross-section of an in-plane switching (IPS) mode liquid crystal panel.

As shown in FIGS. 10A and 10B, a cell gap is maintained between the lower array substrates 110 and 110' and the upper color filter substrates 105 and 105', the substrates are attached by seal patterns 160 and 160' formed at an outer edge of the image display region to form a liquid crystal panel. The color filter substrates 105 and 105' are fabricated by forming black matrixes 106 and 106' on the color filter substrates 105 and 105', forming color filters (not shown) on the color filter substrates 105 and 105' separated by the black matrixes 106 and 106', and forming overcoat layers 109 and 109' over the entire upper surface of the color filter substrates 105 and 105' with the black matrixes 106 and 106' and the color filters formed thereon. The black matrixes 106 and 106' define boundaries of pixel regions to block the leakage of light from a backlight (not shown) at a lower portion of the liquid crystal panel and also prevents color mixing between adjacent pixels. In addition, the color filters include red, green and blue sub-color filters in each unit pixel. Each of the color filters partially overlap the black matrixes 106 and 106'. The overcoat layers 109 and 109' serve to planarize the upper surface of the black matrixes 106 and 106' and the color filters.

In the case of the TN mode liquid crystal panel, a common electrode 108 is formed on the entire upper surface of the upper color filter substrate 105, and in the case of the IPS mode liquid crystal panel, a common electrode (not shown) is formed together with a pixel electrode (not shown) on the lower array substrate 110'. Passivation layers 115 and 115' are formed on an upper surface of the array substrates 110 and 110', and alignment films 150, 150', 155 and 155' are formed over mutually facing surfaces of the array substrate 110 and 110' and the color filter substrates 105 and 105'. The alignment films 150, 150', 155 and 155' are formed over all the surface of the array substrates 110 and 110' and the color filter substrates 105 and 105' such that seal patterns 160 and 160' are positioned between the upper alignment films 155 and 155' and the lower alignment films 150 and 150'.

Because an edge portion of the alignment films 150, 150', 155 and 155' is positioned outside the seal patterns 160 and 160', contaminants at the edge portion of the alignment films 150, 150', 155 and 155' do not contact the liquid crystal material within the liquid crystal panel. In addition, because the alignment films 150, 150', 155 and 155' are over the overcoat layers 109 and 109', the organic material of the overcoat layers 109 and 109' is not subjected to the rubbing cloth during the rubbing process. Herein, reference numerals Rp and Rp' denote pad regions of the lower array substrates 110 and 110', and there are no lower alignment films 150 and 150' or passivation layers 115 and 115' on the pad regions Rp and Rp' of the array substrates 110 and 110'.

It will be apparent to those skilled in the art that various modifications and variations can be made in the liquid crystal panel and fabrication method thereof in embodiments of the invention without departing from the spirit or scope of the invention. Thus, it is intended that embodiments of the invention cover the modifications and variations of this invention provided they come within the scope of the appended claims and their equivalents.

What is claimed is:

1. A method for fabricating a liquid crystal panel comprising:

providing first and second mother substrates each having a plurality of panel regions;

performing an array process on the first mother substrate to form a plurality of array substrates having a pad part on the panel regions of the first mother substrate;

performing a color filter process on the second mother substrate to form a plurality of color filter substrates on the panel regions of the second mother substrate;

forming an alignment film on the entire surface of the first and second mother substrates;

performing rubbing in a state that the alignment film is formed on the entire surface of the first and second mother substrates;

forming seal patterns on an outer edge portion of the color filter substrate of the rubbed second mother substrate, dropping liquid crystal material on the array substrate of the rubbed first mother substrate and then attaching the first and second mother substrates;

cutting the attached mother substrates into a plurality of unit liquid crystal panels with the pad part of the array substrate exposed;

loading the cut unit liquid crystal panel within a plasma equipment; and removing a portion of the alignment film formed at the exposed pad part of the array substrate of the loaded cut unit liquid crystal panel within the plasma equipment by dry etching using plasma, wherein the dry etching is performed under conditions of a pressure 500 mTorr, RF power 2000 W, $O_2$ gas 1500 sccm and $SF_6$ gas 40 sccm for 40 sec to remove the alignment film without damaging the seal patterns.

2. The method of claim 1, further comprising:

dropping liquid crystal material on the array substrate of the first mother substrate wherein an edge portion of the alignment film is positioned outside the seal patterns to prevent liquid crystal within the panel regions from contacting with contaminants of the edge portion of the alignment film.

3. A method for fabricating a liquid crystal panel comprising:

providing first and second mother substrates each having a plurality of panel regions;

performing an array process on the first mother substrate to form a plurality of array substrates having a pad part on the panel regions of the first mother substrate;

performing a color filter process on the second mother substrate to form a plurality of color filter substrates on the panel regions of the second mother substrate;

forming an alignment film on the entire surface of the first and second mother substrates;

performing rubbing in a state that the alignment film is formed on the entire surface of the first and second mother substrates;

forming seal patterns on an outer edge portion of the color filter substrate of the rubbed second mother substrate, dropping liquid crystal material on the array substrate of the rubbed first mother substrate and then attaching the first and second mother substrates;

cutting the attached mother substrates into a plurality of unit liquid crystal panels with the bad part of the array substrate exposed;

providing a stripping solution including an alignment film stripper;

putting the plurality of cut unit liquid crystal panels in a cassette within the stripping solution; and stripping a portion of the alignment film formed at the exposed pad part of the array substrate of the plurality of cut unit liquid crystal panels in the cassette at the same time, wherein the stripping solution includes 20% -25% of a builder, 20% -25% of water-soluble solvent, 30% -45% of a metal ion sealing material, 0.1% of surfactant, and 30% -40% of water and a predetermined stripping time is set, so as to only strip the alignment film on the exposed pad part.

* * * * *